United States Patent [19]
Williams

[11] 3,862,628
[45] Jan. 28, 1975

[54] PEAK FLOW METERS

[75] Inventor: Garnet Montague Eveleigh Williams, London, England

[73] Assignee: Ferraris Development and Engineering Company Limited, London, England

[22] Filed: May 2, 1972

[21] Appl. No.: 249,520

[52] U.S. Cl................ 128/2.08, 73/239, 73/228
[51] Int. Cl.......................... A61b 5/08, G01f 3/12
[58] Field of Search ............ 73/208, 209, 210, 228, 73/239, 240, 238; 128/2 C, 2.08, 208; 272/57 F

[56] References Cited
UNITED STATES PATENTS
| | | | |
|---|---|---|---|
| 2,388,672 | 11/1945 | Brewer | 73/209 |
| 2,724,969 | 11/1955 | Bloser | 73/228 |
| 3,182,500 | 5/1965 | Ishii | 73/209 |

FOREIGN PATENTS OR APPLICATIONS
| | | | |
|---|---|---|---|
| 1,160,669 | 8/1969 | Great Britain | 73/239 |
| 1,557,564 | 1/1969 | France | 73/209 |

Primary Examiner—Richard C. Queisser
Assistant Examiner—Stephen A. Kreitman
Attorney, Agent, or Firm—Edwin E. Greigg

[57] ABSTRACT

A peak flow meter for determining the maximum flow of air exhaled by a person. The meter comprises a piston or a vane which is housed within a casing so as to be moved within the casing against the action of a spring by air blown into the casing. The piston or vane moves alongside a uniform width slot in the casing so as to expose a portion of the slot to the space within the casing into which air is blown, the slot portion so exposed increasing in length with movement of the vane or piston. The position relative to the slot at which the piston or vane comes to rest is an indication of the rate of flow of air blown into the casing. The improvement comprises providing a gap between the piston or vane and the casing wall, the cross-sectional area of the gap varying for different positions of the piston or vane within the casing so that the sensitivity of the meter varies correspondingly.

5 Claims, 4 Drawing Figures

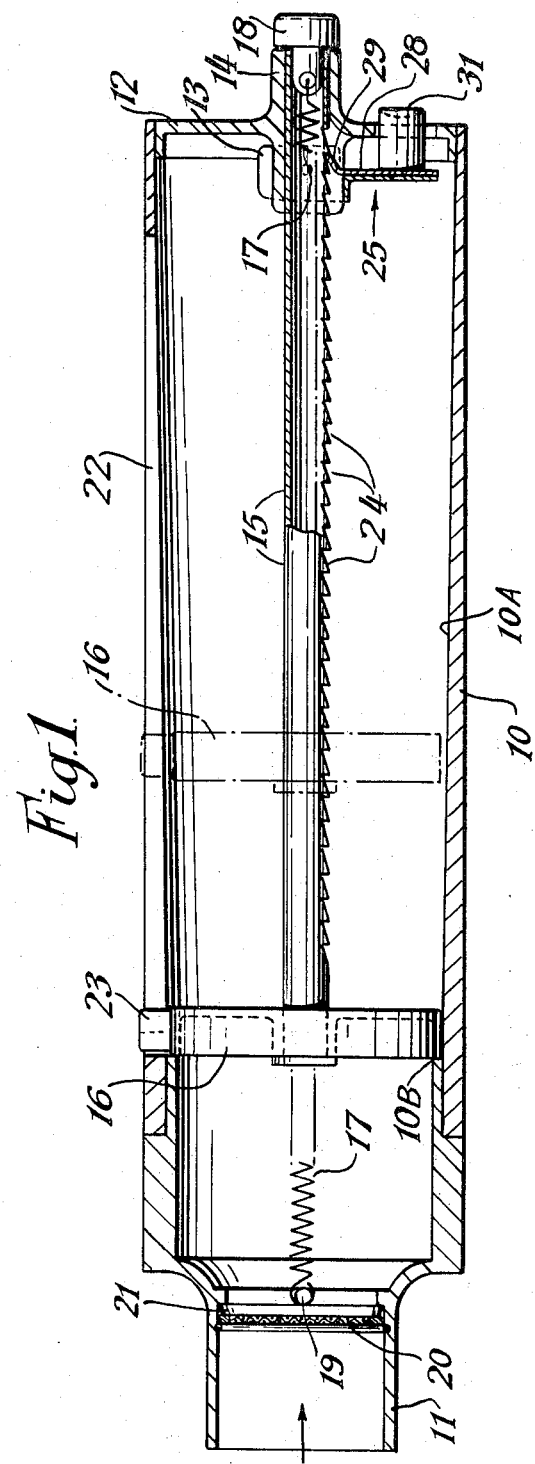

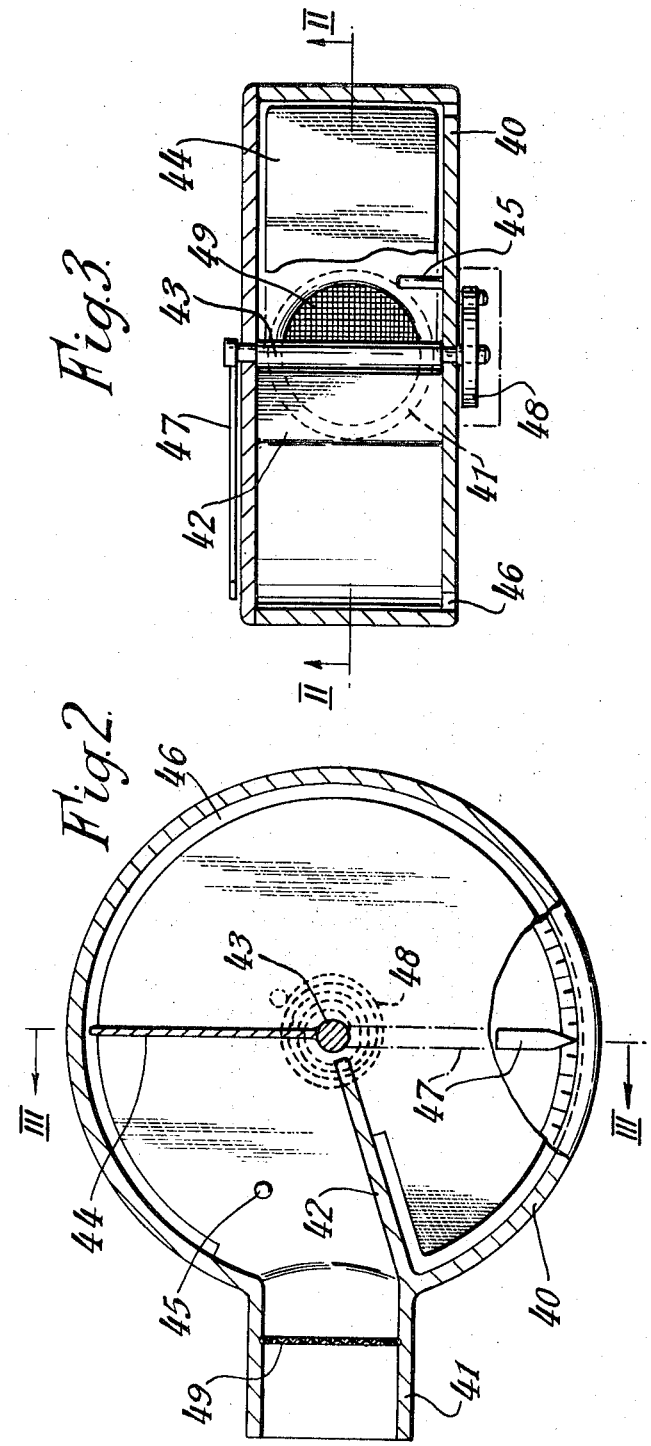

PEAK FLOW METERS

BACKGROUND OF THE INVENTION

This invention relates to a peak flow meter for determining the maximum flow of air which a person can produce when exhaling air, the peak flow meter being of the kind comprising a casing having a mouthpiece and defining a chamber, a movable member extending transversely of the chamber and serving as, or carrying an indicator movable relative to scale markings on the casing, resilient means acting upon the movable member to oppose movement of the movable member away from the mouthpiece, and a slot extending through the casing into the chamber, the arrangement being such that air blown into the mouthpiece by a person acts upon the movable member to urge it away from the mouthpiece against the action of the resilient means, such movement of the movable member away from the mouthpiece increasing the length of the slot portion which opens into that part of the chamber between the mouthpiece and the movable member and through which air blown into the chamber can escape.

In certain circumstances it is desirable that the sensitivity of the peak flow meter should differ over a selected part of its overall range of scale markings from the sensitivity of the meter over the remainder of the range. Such a variation in sensitivity may be achieved by varying the width of the slot, the meter being more sensitive where the slot is narrowest and being less sensitive where the slot is widest. However a non-parallel sided slot is difficult to manufacture and the provision of wider slot portions increases the risk of dirt and other foreign matter entering the interior of the peak flow meter.

OBJECT AND SUMMARY OF THE INVENTION

It is an object of this invention to provide a peak flow meter of the kind described which is more sensitive over part of the range of scale markings than over the remainder of that range and which has a substantially parallel sided slot.

According to this invention there is provided a peak flow meter of the kind described in which said slot is substantially parallel sided, wherein the peak flow meter includes means which permit a controlled flow of air between the chamber wall and the periphery of the movable member during movement of the movable member away from the mouthpiece, and which are arranged so that the resistance to air flow between the movable member and the chamber wall is greater when the movable member is in one position relative to the casing than it is when the movable member is in another position relative to the casing, so that the peak flow meter is more sensitive when the movable member is in said one position than when it is in said other position.

Production of a peak flow meter having a law of scale which approximates closely to a desired law of scale, such as a linear law of scale, is facilitated by the ability to arrange for a controlled variation in the resistance to air flow between the movable member and the chamber wall during movement of the movable member.

Preferably the means which permit a controlled air flow between the chamber wall and the periphery of the movable member during movement of the movable member away from the mouthpiece comprises the gap between the chamber wall and the periphery of the movable member, the gap being smaller when the movable member is in said one position than when the movable member is in said other position. Conveniently a releasable one way brake, which may be a detent device is provided for holding the movable member releasably in the position furthest from the mouthpiece to which it is moved by the action of blowing air into the mouthpiece.

The peak flow meter may be of the kind wherein the chamber comprises a cylinder, the movable member being a piston movable axially within the cylinder and the slot extending axially of the cylinder. The side wall of the cylinder may be frusto-conical diverging away from the mouthpiece so that the sensitivity of the meter decreases as the piston moves away from the mouthpiece. The smallest or largest diameter portion of the cylinder side wall may be between the axially spaced ends of the cylinder side wall instead of being at an end thereof. A portion of the side wall of the cylinder may be curved.

Alternatively the peak flow meter may be of the kind in which the movable member comprises a vane extending radially from an axle mounted within a cylindrical casing for rotation about the axis of the casing, and the slot follows an arcuate path.

Two embodiments of this invention will be described now by way of example only with reference to the accompanying drawings of which:

BRIEF DESCRIPTION OF THE DRAWING

FIG. 1 is a longitudinally sectioned elevation of one embodiment of peak flow meter according to this invention;

FIG. 2 is a plan view of a second embodiment of this invention sectioned on the line II—II of FIG. 3; and FIG. 3 is a section on the line III—III of FIG. 2.

DESCRIPTION OF THE PREFERRED EMBODIMENTS

Figure 4:
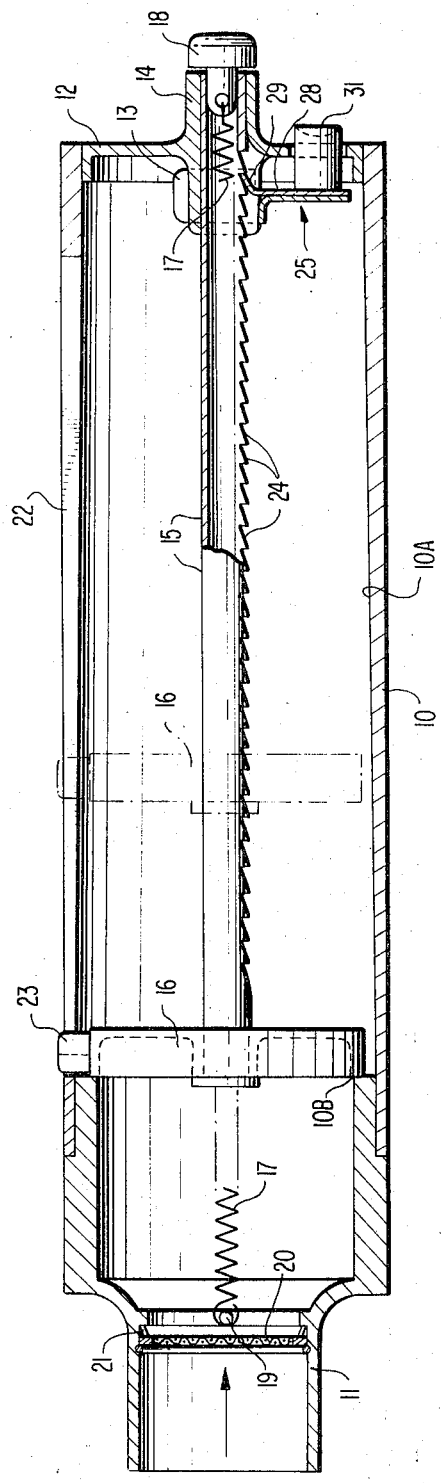
FIG. 4 is a longitudinal sectional elevation of a variation of the embodiment shown in FIG. 1.

The peak flow meter illustrated in FIG. 1 of the accompanying drawings is similar to the peak flow meter described and illustrated in the complete specification of our British Pat. No. 1,160,669 and comprises a generally cylindrical body 10 carrying a mouth-piece 11 at one end, and a cap 12 closing the other end of the body. The diameter of the mouthpiece 11 is less than the diameter of the body 10. The radially inner surface 10A of the cylindrical body 10 is frusto-conical diverging away from the mouthpiece 11 towards the end cap 12. In cross-section the wall of the body 10 has a straight portion and an arcuate portion, the arcuate portion defining a major part of a circle and the straight portion being a chord of that circle.

The end cap 12 has central tubular bosses 13 and 14 projecting from its inner and outer sides respectively. The bores of the bosses 13 and 14 provide a guide for a tubular piston rod 15. The tubular piston rod 15 carries a piston 16 which is slidable in the body 10. A tension spring 17 urges the piston 16 towards a position near to the mouth-piece 11 in which its radially outer periphery engages an abutment 10B of the cylindrical body 10. The piston 16 is shaped similarly in cross-section to the wall of the body 10. The tension spring 17 extends through the tubular rod 15, is anchored at one end to a plug 18 closing the outer end of the tubular rod 15, and at its other end to a diametral rod 19 carried by a ring 21 mounted in the mouth-piece 11. A stainless steel wire gauze filter 20 extends transversely across the aperture defined by the mouth-piece 11.

A parallel sided slot 22 is formed in the side wall of the cylindrical body 10 so as to extend axially thereof. The piston 16 carries an index 23 which engages within the parallel sided slot 22. The index 23 cooperates with scale markings on the radially outer surface of the cylindrical body 10, the scale markings being at one side of the slot 22.

The tubular piston rod 15 is provided with a longitudinal series of ratchet teeth 24. A push button operated detent device 25 has a detent finger 28 which is arranged to cooperate with the ratchet teeth 24, the detent finger 28 having an inclined inner end 29 which is engaged in one of the ratchet teeth 24. The detent finger 28 is urged resiliently into engagement with the teeth 24, and can be disengaged therefrom by operation of the push button 31 of the push button operated detent device 25.

When a person blows into the mouth-piece 11, the air entering the body 10 displaces the piston 16 away from the mouth-piece end of the body 10, tensioning the spring 17, whilst the detent finger 28 rides idly over the ratchet teeth 24. When the area of slot 22 exposed is such that the impulse energy of air blown into the instrument equals the energy of the air escaping through the slot 22 together with energy dissipated otherwise into the instrument which includes kinetic energy attained by the movable parts of the instrument, energy stored in the tension spring 17 and work done in overcoming friction, the piston 16 is held stationary and the position of the index 23 indicates the measure of the maximum or peak rate of flow of air blown into the casing 10 in the course of measurement. As soon as the breath of the person begins to wane, the piston 16 tends to return under the spring load, but is immediately held against such return movement by engagement of the detent finger 28 with the ratchet teeth 24. Dependent upon the pitch of the ratchet teeth 24 the piston 16 is held at, or near to, its position of maximum displacement. The position in which the piston 16 is held can be read on the scale.

To prepare the peak flow meter for a further test, all that is necessary is to press the push button 31 inwardly to release the detent finger from the ratchet teeth, allowing the piston to return to its initial position.

The gap between the piston 16 and the cylinder side wall 10A is smallest at the end of the path of axial movement of the piston 16 near the mouth-piece 11 so that the resistance to air flow through that gap is greatest at that point and a major proportion of the total energy of air blown into the mouthpiece 11 is dissipated in moving the piston 16 axially within the cylindrical body 10. As the piston 16 moves away from the mouthpiece 11 the gap between the piston 16 and the cylinder side wall 10A increases in size so that the resistance to air flow therethrough reduces and the proportion of the total energy which is dissipated in moving the piston 16 further is reduced. Thus the motion of the piston 16 becomes progressively less responsive to air blown into the mouthpiece 11 as the piston 16 moves towards the end cap 12. It will be understood that the scale markings are arranged accordingly.

Various other arrangements of tapered bore may be employed if it is desired that the more sensitive part of the range of markings be elsewhere than at the end nearer to the mouthpiece 11. For example, the side wall of the cylinder body 10 may be frusto-conical diverging towards the mouthpiece 11 if it is desired that the more sensitive part of the range of markings should be at the end remote from the mouthpiece 11. Alternatively the cylindrical body 10 may have its smallest or largest diameter portion between the axially spaced ends of the cylinder, the cylinder side wall tapering divergently or convergently from that intermediate portion towards each end, if it is desired that the meter should be more sensitive or less sensitive for flow values intermediate of the range of values it can measure. The cylinder side wall may be curved if desired.

Referring now to FIGS. 2 and 3, the peak flow meter comprises a casing 40 defining a cylindrical chamber and having a radially extending mouthpiece 41. A radial wall 42 extends inwardly from a point on the cylindrical outer wall of the casing 40 near to the mouthpiece 41 and terminates near to the centre of the cylindrical casing 40. An axle 43 is mounted within the cylindrical casing 40 for rotation about the axis of the casing 40. A vane 44 is carried by the axle 43 and extends radially therefrom.

A peg 45 (see FIG. 2) extends axially from one radial face of the cylindrical casing 40 within the cylindrical chamber and serves as a stop preventing the vane 44 from being positioned with its radially outer edge between the axle 43 and the mouthpiece 41. A circumferential slot 46 formed in the radially outermost portion of one of the two radial faces of the cylindrical casing 40 extends circumferentially from one of its ends, which is on the side of the radial wall 42 remote from the mouthpiece 41, through more than three quarters of the total circumference of the cylindrical casing 40. The circumferential slot 46 terminates at its other end near to and just short of the mouthpiece 41. The axle 43 carries an indicating arm 47 at one of its ends outside the cylindrical casing 40. The indicating arm 47 extends radially from the axle 43 and is arranged to pass over scale markings on the surface of the corresponding radial face of the cylindrical casing 40. The other end of the axle 43 is secured to a torsion spring 48 outside the cylindrical casing 40. The end of the torsion spring 48 remote from the axle 43 is anchored to the cylindrical casing 40. The torsion spring 48 acts upon the axle 43 to urge the vane 44 into engagement with the axially extending stop afforded by the peg 45 within the casing 40.

The dimensions of the vane 44 are such that a small clearance is defined between its three edges not secured to the axle 43 and the internal surface of the walls of the casing 40. The casing 40 is arranged so that the clearance is smallest at that part of the arcuate path of movement of the vane 44 within the casing 40 corresponding to the range of scale markings of the meter for which the meter is required to be more sensitive.

A releasable one-way brake (not shown) is provided which holds the vane 43 and the indicating arm 47 at, or near to the position of maximum deflection from the peg 45. A release mechanism (not shown) e.g. a manually operable button, is provided to release the one way brake and allow the vane 44 to return to engage the peg 45 under the influence of the torsion spring 48. A wire or plastics gauze mesh 49 is mounted within the mouthpiece 41 so as to extend transversely thereof.

In use of the instrument, a person blows repeatedly into the instrument through the mouthpiece 41.

The provision of the wire gauze mesh 49 prevents the ingress of large particles of sputum etc. into the interior of the cylindrical casing.

Air blown into the mouthpiece 41 passes through the wire or plastics gauze mesh 49 into the interior of the cylindrical casing 40 and acts upon the vane 44. A proportion of the air leaks past the vane 44 through the space between the three edges of the vane 44 and the corresponding interior walls of the cylindrical casing 40. A major part of the air blown into the interior of the cylindrical casing 40 acts upon the vane 44 to rotate the vane 44 within the casing 40 against the action of the torsion spring 48. As the vane 44 rotates against the action of the torsion spring 48, a portion of the circumferential slot 46 is exposed and air blown into the interior of the casing 40 escapes through that portion of the slot 46 so exposed. when the area of slot 46 exposed is such that the impulse energy of air blown into the instrument equals the energy of the air escaping through the slot 46 together with energy dissipated otherwise into the instrument which includes kinetic energy attained by the movable parts of the instrument, energy stored in the torsion spring 48 and work done in overcoming friction, the vane 44 is held stationary and the position of the indicating arm 47 indicates the measure of the maximum or peak rate of flow of air blown into the casing 40 in the course of measurement. This position of the indicating arm 47 is a measure of the peak rate of flow of air blown into the meter by the person. The releasable one-way brake ensures that the indicating arm 47 is held in the position which is interpreted as the greatest rate of flow of air blown into the instrument by the person.

It will be understood that the proportion of the air which leaks past the vane 44 is dependent upon the dimensions of the clearance between the vane 44 and the interior walls of the casing 40, where the clearance is smallest, the proporation of air leaking therethrough is smallest and the instrument is more sensitive. Conversely the instrument is less sensitive where the clearance is largest.

I claim:

1. A peak flow meter for determining the maximum flow of air which a person can produce when exhaling air, comprising a casing having a mouthpiece and defining a chamber, a member having an inoperative position and movable relative to the casing within the chamber and carrying an indicator movable relative to scale markings on the casing, resilient means acting upon the movable member to oppose movement of the movable member away from the mouthpiece and retain it in contact with abutment means, and a slotted area extending through the casing into the chamber arranged to receive the movable indicator, the width of the slot being uniform, the arrangement being such that air blown into the mouthpiece by a person acts upon the movable member to urge it away from the mouthpiece against the action of the resilient means, such movement of the movable member away from the mouthpiece increasing the length of the slot portion which opens into that part of the chamber between the mouthpiece and the movable member and through which air blown into the chamber can escape, in which the improvement comprises providing a frusto-conical chamber wall surrounding the movable member, said frusto-conical wall extending beyond said abutment means and in the direction of movement of the movable member, said indicator being movable into an operative position by air blown into the mouthpiece with the degree of movement of the indicator partly dependent upon the direction in which the frusto-conical wall extends.

2. A peak flow meter as claimed in claim 1, wherein the frusto-conical wall diverges in its extent toward said mouthpiece.

3. A peak flow meter as claimed in claim 1, wherein said casing includes a sleeve member, wherein said abutment means includes an abutment at the terminus of said sleeve member, and wherein said frusto-conical wall is arranged to encompass a portion of the sleeve member.

4. A peak flow meter as claimed in claim 1, wherein said frusto-conical wall diverges in its extent away from the mouthpiece.

5. A peak flow meter for determining the maximum flow of air which a person can produce when exhaling air, comprising a casing having a mouthpiece and bottom, side and top walls defining a chamber having an inner wall, a member movable relative to the casing within the chamber and carrying an indicator movable relative to scale markings on the top wall of the casing, resilient means acting upon the movable member to oppose movement of the movable member away from the mouthpiece, and a slot extending through the bottom wall of the casing and into the chamber, the width of the slot being uniform, the arrangement being such that air blown into the mouthpiece by a person acts upon the movable member to urge it away from the mouthpiece against the action of the resilient means, such movement of the movable member away from the mouthpiece increasing the length of the slot portion which opens into that part of the chamber between the mouthpiece and the movable member and through which air blown into the chamber can escape, wherein the casing is cylindrical, the movable member is a vane which extends radially from an axle mounted within the cylindrical casing for rotation about the axis of the casing, the slot follows an arcuate path, and said vane and the inner wall define a gap which increases in width as said vane moves further away from the mouthpiece against the action of the resilient means.

\* \* \* \* \*